Patented Aug. 9, 1949

2,478,768

UNITED STATES PATENT OFFICE 2,478,768

MANUFACTURE OF AZO LAKES

Roy C. Locke, Salem, N. J., assignor to E. I. du Pont de Nemours & Company, Wilmington, Del., a corporation of Delaware No Drawing. Application October 4, 1945,
Serial No. 620,397

5 Claims. (Cl. 260—144)

This invention relates to new processes for manufacturing lakes of azo compounds.

Heretofore, the manufacture of lakes from azo compounds consisted in general of completing each of three steps or manufacturing operations in succession and completing each step independently of the other. Accordingly, the diazotization of the amino base was completed in one reaction medium or operation, then the formation of a salt of a product of coupling was completed in a second operation and medium, and finally laking the salt of the coupling product for forming the insoluble lake was completed in a third operation and medium. One modification of the general practice consisted in making an alkaline water solution containing an amino base which is soluble in alkaline medium, the coupling component, the alkali nitrite and a salt of an alkaline earth metal. The pH value of such a solution would be about 10.7. This solution was then acidified to a pH value of about 1.5 in order to liberate the nitrous acid and effect diazotization. This medium contained the diazo of the amino base in suspension in the presence of a slurry of the coupling component. After diazotization the medium was again made alkaline so as to provide a pH value of about 10.7 in order to provide a coupling and laking medium. Such process succeed in combining only two of the three necessary operations. The formation of the nitrous acid and the diazotization of the amino base were carried on in a different kind of a medium from that used in the coupling and laking operations. Each of these reaction media or the media formed in the transitional period from one to the other of these reactions provide media wherein uncontrollable side reactions or reactions difficult to control take place. The quality of the final lake is deleteriously affected by these conditions. This procedure also permits of wide variations in the process of forming the final product which is believed to be one reason for great variations in the product when made by different operators. It is therefore desirable to provide processes which are less susceptible to the production of variable products.

A process has now been discovered wherein diazotization as well as coupling and lake formation can be carried out at one time in a single reaction medium. The physical condition of the lakes produced in the process of the invention are different from those produced by prior art processes and considerable improvement in the products is attained. The lakes produced in accordance with the present invention are better adapted for use in pigmenting other materials than the lakes hitherto produced and other advantageous results are attained.

It is among the objects of the present invention to provide improved and more dependable processes for making lakes of azo compounds. Another abject of the invention is to provide processes for making lakes of azo compounds which employ a small number of easily controllable operations. Another object of the invention is to provide laked compounds having improved properties. Another object is to provide a method for making azo lakes by a continuous process using a single medium and a single combining operation. A further object is to provide more economical methods for producing laked azo pigments. Still other objects of the invention will be apparent from the following more detailed description.

The objects of the present invention are attained by effecting an instantaneous triple reaction wherein the diazotization of the amino base, the coupling of the resulting diazo with the coupling component, and the laking reaction are carried out in a single medium which has hitherto been considered unsuitable for effective diazotization. In general, the process comprises the use of an acid water solution containing the laking agent and any of the components necessary for forming azo coupling products except the diazotizing agent; and an alkaline water solution containing the diazotizing agent. The alkaline solution may contain or be devoid of either or both of the amio base and the coupling component. The solutions contain acid and alkali in quantity such that when the requisite quanitities of amino compound, coupling compound, and laking agent are mixed for making the product, the mixture will have a pH value of about 6.0 to about 7.2. The acid solution contains about 2 to 2.4 moles of acid per mole of the diazotizable amino base. Coupling components which contain primary amino groups cannot be used in the process of the present invention. Either or both of the amino base and coupling component may contain an acid lake forming group such as carboxy and sulfonic acid. At least one such group must be present in the coupled product.

The invention will be more fully understood from the following more detailed description in which illustrative embodiments of the invention and the principle of operation are set forth. In the examples parts are expressed in parts by weight unless otherwise specified.

Example I

*Solution A.*—A water solution alkaline with an alkali metal hydroxide and containing an amino base and a coupling component which are soluble in the alkaline water solution, is prepared by dissolving 100 parts para toluidine meta sulfonic acid (0.535 mole), 80 parts of 2-hydroxy naphthalene (0.556 mole) and 68 parts sodium hydroxide (1.7 mole) in 1000 parts of water at 24° C. Stir until a complete solution of the ingredients is obtained. Add 37.0 parts sodium nitrite (0.536 mole) dissolved in 370 parts of water at 24° C.

*Solution B.*—An acid water solution containing a soluble salt of the laking metal is made by dissolving 133.5 parts barium chloride ($BaCl_2.2H_2O$) (0.545 mole) in 1335 parts water at 24° C. Add 123.5 parts hydrochloric acid (37.5%) (1.27 mole). Adjust temperature to 24° C.

Add solution B to solution A with good agitation at as rapid a rate as possible. Then stir for 15 minutes. Make the usual tests for completeness of coupling and pH value. The final mixture, having a pH value from 6.0 to 7.2, is heated to 50° C. to develop the color. The insoluble lake is then recovered by filtration, washed with water, and dried. The resulting red lake is the barium salt of 4-methyl-2-sulfo-benzene-azo-2-hydroxy naphthalene. A yield of 96% of theory based on the amino compound is obtained.

The lithographic ink prepared from this lake has a greater depth of mass tone, is very much bluer in shade and possesses 35% greater tinctorial strength than the same product made by the prior art methods referred to above.

When a reaction temperature of 100° C. is used instead of 24° C. in the foregoing example, a pigment, having a greater depth of mass tone, much bluer shade, and 10% to 15% greater tinting strength, is obtained. Conversely, when the final processing temperature is lowered to 5° C. the mass tone is less intense and the shade is yellower than when the processing temperature of 24° C. is used.

In the prior art processes, if the diazotization and coupling reactions are carried out at temperatures above 24° C. before laking, very poor results are obtained.

In carrying out the process in accordance with this example, if the pH value of the final mixture varies outside the range from 6.0 to 7.2 the value should be adjusted within the indicated limits by adding as much hydrochloric acid or sodium hydroxide as may be required.

Example II

In the procedure of Example I a molecular equivalent of 2-hydroxy-naphthalene-3-carboxylic acid is used instead of 2-hydroxy-naphthalene and 2-molecular equivalents of calcium chloride are used instead of the barium chloride. A calcium lake of 2-sulfo-4-methyl-benzene-azo-2-hydroxy naphthalene-3-carboxylic acid is obtained.

The product is much bluer in shade, much more intense in mass tone and has a tinctorial value 25% to 30% greater when tested in lithographic inks than products made from the same intermediates by carrying out the diazotization, the coupling and the laking in separate individually controlled steps in accordance with the prior art practices.

The lake made by the present process at a reaction temperature of 24° C. was found to have a greater degree of development than those products developed in accordance with conventional prior art processes with laking at temperatures between 50° and 100° C.

Example III

In the procedure of Example I molecular equivalents of sodium nitrite, sodium hydroxide and barium chloride and (1-parasulfophenyl)-3-methyl-5-pyrazolone are used to form solution A while a molecular equivalent of aniline is dissolved in the hydrochloric acid to form solution B. A yellow barium lake of benzene-azo-(1-p-sulfophenyl)-3-methyl-5-pyrazolone is obtained.

As compared to the lakes made from the same intermediates by processes wherein the diazotization, coupling and laking are completed in separate operations, this product is characterized by being redder in mass tone and shade and in having about 20% greater tinting strength when tested in a lithographic ink.

Example IV

In the procedure of Example I a molecular equivalent of ortho-amino-benzoic acid is substituted for the amino base in solution A instead of the amino base there used. In solution B, one molecular equivalent of 2-hydroxy-naphthalene-3:6-disulfonic acid is used as the coupling component and 3 molecular equivalents of lead acetate are used for the alkaline earth metal salt. The laking is finished at 100° C. The resulting product is the lead salt of ortho-carboxy-benzene-azo-2-hydroxy-naphthalene-3:6-disulfonic acid.

The general order of superiority of this lake over the products of the prior art processes is the same as that set forth in Example I.

Example V

In the procedure of Example I all of the solid ingredients are combined as a dry mixture and then the mixture is dissolved in 3000 parts of water to form solution A. The rest of the process is carried out as set forth in Example I. The resulting lake is similar to that obtained by the process of Example I.

The optimum concentrations for best results range from 12% to 20% of solids in the aqueous medium.

It is advantageous to make dry mixtures of all the reacting solid components since a large amount of the mixture can be made and portions of it used for each run. This tends to produce more uniformity in the products of successive runs.

Example VI

In the procedure of Example II a half molecular equivalent of dianisidine is used for the amino base and it is dissolved in solution B instead of solution A. As compared with the products made from the same components by processes wherein the diazotization, coupling and laking reactions are completed in separate operations, this lake has a greater intensity of mass tone, a greener and brighter shade and 35% to 40% greater tinctorial strength in the oil medium used for lithographic printing.

Example VII

Solution A is made by dissolving 100 parts of 1-sulfo-2-amino naphthalene (0.45 mole), 65 parts of 2-hydroxy naphthalene (0.45 mole) and 36 parts sodium hydroxide (0.90 mole) in 1000 parts of water at 24° C. Then, a solution containing 31 parts of sodium nitrite (0.45 mole) dissolved in 169 parts of water at 24° C. is added. The pH value of this solution is 10.7.

Solution B is made by dissolving 46.7 parts barium chloride (0.23 mole) in 566.0 parts of water at 24° C. Then, 87.5 parts of hydrochloric acid 37.5% (0.9 mole) are added. The pH value of this solution is 1.5.

Solutions A and B are then combined by adding both simultaneously to a third vessel at a controlled rate during a 5 minute period. The mixture is agitated while the solutions are being combined and the two solutions are combined in volumes so as to maintain a constant pH ranging from 6.5 to 7.2 throughout the combining operation. The usual tests are made for completeness of coupling and pH. The resulting mixture is stirred 15 minutes and heated to 50° C., and then the insoluble barium lake of 1-sulfo naphthalene-azo-2-hydroxy-naphthalene is separated by filtration, washed, and dried. The yields are very close to theoretical.

The pigment thus obtained possesses physical properties superior to those of the products made by the prior art processes.

*Example VIII*

The processes of the present invention are adaptable to continuous operations in the making of lakes. Accordingly, the solutions described in Example I are prepared. These solutions are metered into a single pump for rapid mixing and then into a coiled tube for further rapid agitation. Heat may be applied to all or a part of the coil for bringing the mixture to a temperature within the range of 24° to 100° C. The slurry containing the lake which issues from the end of the coiled tube can then be de-watered and dried continuously by known standard mechanical methods.

An alternative method comprises metering the solutions in the required proportions to maintain the pH within the required range into a small vessel fitted with a high speed agitator. The vessel is heated, if necessary, and the lake is formed under conditions of desired temperature and rapid agitation. The slurry is continuously drawn off by overflow.

It is essential to provide acid in one of the solutions to be mixed and alkali in the other so that the ratio of acid and alkali in the two solutions will produce a resultant mixture having a pH value within the range of 6 to 7.2 when the solutions are mixed in the proportions necessary for supplying the proper and intended proportions of azo, coupling, and laking components to be reacted. While the present invention permits of taking the fullest advantage of the use of substantially equi-molecular proportions of the azo, coupling, and laking components and of the diazotizing agent as set forth in the foregoing examples, variations in the proportions of these constituents can be made. About 2.0 to 2.4 moles of acid per mole of the diazotizable amino group are used. When less than this proportion of acid is used the diazo reaction is incomplete and when more than this proportion of acid is used unnecessarily large quantities of base are consumed. The diazotizing agent must be carried in the alkaline solution in order to avoid the formation of undesired by-products and in order that the proper functioning of the process may result. The amino compound and the coupling component may be carried in the acid or the alkaline solution, whichever may be convenient for producing a complete solution of these components. The alkaline earth metal salt is preferably carried in the acid solution.

A pH value below 6.0 must be avoided in the coupling medium in order to attain the advantages of the present invention. This requires that the acid and alkaline solutions may be mixed simultaneously or that the acid solution containing its components may be added to a batch of alkaline solution containing its components, but the alkaline solution may not be added gradually to a batch of acid solution without giving inferior results. An excess of the laking salt over the theoretical amount may be used but an excess is unnecessary. The concentrations of the various components may be varied so long as all of them in the unmixed solutions are completely in solution.

The rate of mixing the solutions may be varied but the manner of mixing must be such that the pH value of the resulting mixture will not be below about 6.0. The reaction mixture may have a pH value higher than about 7.2 at the start of mixing and be gradually reduced to a value within the optimum range as the mixing proceeds, but this variation is generally available when the specified ratio of acid to amino base is present, only when the acid solution is added sufficiently rapidly to insure that diazotization of the amino base is completed before the acid is neutralized. Where the acid solution is added to the alkaline solution, a considerable excess of the alkali metal hydroxide must be used in order to maintain the optimum pH value over that used when the solutions are mixed continuously, such as the procedure of pouring both solutions simultaneously into a third container. Defects attributable to failure to observe critical pH relationships are low yields, tinting deficiencies, inferior light fastness, and lack of resistance to bleeding in media such as oil, alcohol, or water. Lack of uniformity among batches made by different operators, and lack of uniformity among batches made by the same operator are also attributable to lack of uniformity in pH values of the coupling media.

All primary arylamines and azo coupling components capable of making an azo combination susceptible for laking can be used except those specifically excluded or mentioned, and all soluble salts of laking agents can be used, such as the soluble salts of the alkaline earth metals, manganese, magnesium, tin, iron, copper, antimony, cadmium, and titanium.

The superior properties of the colored lakes made in accordance with the present invention are believed to be the result of causing the diazo component to react so rapidly during the diazotization, coupling and laking reactions that practically no crystal growth of intermediate compounds takes place which ordinarily takes place when these reactions are performed in separate and successive steps. In the present process the constituents are caused to pass directly from liquid phase to the final insoluble laked product without forming aggregates of partially soluble or insoluble intermediate compounds. The result is believed to be more perfect homogeneity of each particle of the product. However, it is to be understood that the invention is not limited to the above stated theory.

In the practice of the new processes less process equipment is needed than in the practice of prior art processes wherein intermediate parts of the process are completed before proceeding to the next. By prearranging the quantities of acid and other constituents in the initial mixtures, several controls of the intermediate reaction media are eliminated and the entire process is greatly simplified, shortened and made more economical. The processes herein provided admit of relatively high reaction temperatures throughout the process which contribute to the economy of operation in that cooling to temperatures below ordinary atmospheric temperatures is avoided. The superior physical properties of the pigments increase their value as pigmenting materials.

From the foregoing disclosure it will be recognized that the invention is susceptible of modification without departing from the spirit and scope thereof and it is to be understood that the invention is not restricted to the specific illustrations thereof herein set forth.

I claim:

1. The process of making lakes of azo compounds which comprises making two water solutions, one of which is acid and the other is alkaline, said acid and alkaline solutions being made so that a mixture of them will contain a laking agent, a coupling component which is devoid of primary amine groups and a diazotizable primary aryl amine, at least one of said azo dye components having an acid lake-forming group, said acid solution containing a laking agent and about 2 to about 2.4 moles of an inorganic acid per mole of diazotizable amine to be diazotized, and said alkaline solution containing a diazotizing agent and alkali sufficient with said acid solution to produce a mixture having a pH value of about 6.0 to about 7.2; mixing said solutions; and maintaining a pH value of not less than about 6.0 during substantially all of said mixing.

2. The process in accordance with claim 1 in which both solutions are added gradually and simultaneously to a reaction container and a pH value of about 6.0 to about 7.2 is maintained during all the mixing.

3. The process in accordance with claim 1 in which the reaction is completed at a temperature between about 24° and about 100° C.

4. The process in accordance with claim 1 in which the alkaline solution contains the amino base, coupling component, and the diazotizing agent.

5. The process in accordance with claim 1 in which the solutions are mixed to form a continuously flowing stream of mixture having a pH value of about 6.0 to about 7.2.

ROY C. LOCKE.

REFERENCES CITED

The following references are of record in the file of this patent:

UNITED STATES PATENTS

| Number | Name | Date |
|---|---|---|
| 1,922,463 | Turski | Aug. 15, 1933 |
| 1,999,026 | Tramm | Apr. 23, 1935 |
| 2,025,916 | Tramm | Dec. 31, 1935 |
| 2,249,314 | Lang | July 15, 1941 |
| 2,277,778 | Randall | Mar. 31, 1942 |
| 2,349,561 | Reynolds | May 23, 1944 |
| 2,410,219 | Langstroth | Oct. 29, 1946 |

OTHER REFERENCES

Saunders, "The Aromatic Diazo-Compounds and Their Technical Applications," London, 1936, pages 4, 5, 9, 104, 118.